United States Patent Office 3,536,688
Patented Oct. 27, 1970

3,536,688
NOVEL CIS-POLYCHLOROPRENE BUTADIENYL-TRIALKYLTIN INTERMEDIATES, AND PROCESS FOR PREPARING SAID CIS-POLYMER AND INTERMEDIATE
Carl Albert Aufdermarsh, Jr., Wilmington, Del., assignor to E. I. du Pont de Nemours and Company, Wilmington, Del., a corporation of Delaware
No Drawing. Continuation-in-part of applications Ser. No. 234,529, Oct. 31, 1962, and Ser. No. 476,795, Aug. 2, 1965. This application Apr. 1, 1969, Ser. No. 813,404
Int. Cl. C08d 3/14; C08f 3/32
U.S. Cl. 260—92.3                                     12 Claims

ABSTRACT OF THE DISCLOSURE

Novel butadienyltrialkyltin compounds are produced by effecting contact, in an inert organic solvent of (1,3-butadien-2-yl)magnesium chloride and a trialkyltin compound. The butadienyltrialkyltin compounds can be polymerized to novel polymers by contact with a free radical polymerization initiator, and the resultant polymer can be contacted, in an inert organic solvent, with a stoichiometric amount of chlorine to produce novel chloroprene polymers characterized by a high content of repeat units in the cis configuration.

CROSS REFERENCES TO RELATED APPLICATIONS

This application is a continuation-in-part of my copending application Ser. No. 476,725, filed Aug. 2, 1965 as a continuation-in-part of my then copending original applicatio Ser. No. 234,529 filed Oct. 31, 1962, both now abandoned.

BACKGROUND OF THE INVENTION

This invention is in the field of manufacture of novel chloroprene polymers having a major proportion, i.e. 50 to 100%, of its constituent repeat units in the cis configuration. It is concerned with providing novel intermediate products polymerizable to such high-cis polymers, with processes for making such intermediates, and with the polymerization processes.

A study of the structure of polychloroprenes as described in Journal of Polymer Science 13, 251–62 (1954), made by free radical-initiated polymerization in aqueous emulsion at temperatures ranging from −40° C. to 100° C., has shown that 1,4-polymerization of chloroprene accounts for the greatest part of the structure of the polychloroprenes. This 1,4-polymerization gives rise to units of the structure —CH$_2$—CCl=CH—CH$_2$— (which may be called the 2-chloro-2-buten-1,4-ylene unit) and the content of these units in the final polymer ranges from 99% in polymers made at −40° C. to about 84% in polymers made at 100° C. Of the 1,4-polychloroprene hitherto known, only a small fraction has the cis configuration, which may be represented by the following structure showing two units:

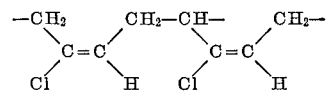

The remainder of the 1,4-polychloroprene units are of the trans configuration, the structure of which is as follows:

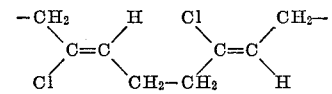

The proportion of 1,4-polymer having the cis structure ranges from less than about 5% in polymer prepared at −40° C. to about 13% in polymer made at 100° C.

It is an object of the present invetnion to provide polychloroprene which consists predominantly, that is, to an amount greater than 50% by weight of the total polymer weight, of 2-chloro-2-buten-1,4-ylene units in the cis configuration (which polymer will hereafter be called cis-polychloroprene). It is another object to provide polychloroprene having the aforementioned units in the cis configuration in substantially greater quantity than present in the polymer prepared by prior art procedures. It is a further object to provide new compounds which are intermediates for the preparation of cis-polychloroprene and to provide a method of preparing cis-polychloroprene therefrom. Other objects will appear hereinafter.

SUMMARY

It has been found that polychloroprene,

[—CH$_2$—CCl=CH—CH$_2$—]$_n$ having the cis configuration, shown previously, can be prepared by polymerizing, in the presence of a free-radical polymerization initiator, a (1,3-butadien-2-yl)-trialkyltin of the formula

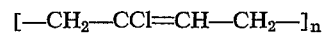
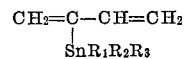

wherein R$_1$, R$_2$, and R$_3$ are alkyl radicals having 1–8 carbon atoms and by contacting the reacting the resultant polymer with chlorine in the presence of an inert solvent medium at a temperature ranging from about −50° C. to about 50° C.

The new (1,3-butadien-2-yl)trialkyltin compounds used in the foregoing process are prepared by contacting and reacting, in the presence of an inert organic solvent, (1,3-butadien-2-yl)-magnesium chloride with a bis(trialkyl)tin oxide or with a trialkyltin halide in which the halide is chloride or bromide.

The above process yields polymers which consist essentially of cis-2-chloro-2-butene-1,4-ylene units. In particular, in the case of polymers made from (1,3-butadiene-2-yl)tributyltin, no trans-1,4-structures have been found by infrared analysis. Since the (1,3-butadien-2-yl)tributyltin compounds are readily polymerized by free radical catalysts, which are also effective for the polymerization of chloroprene to give polymers having predominantly trans-2-chloro-2-buten-1,4-ylene structures, it will be evident that chloroprene can be copolymerized with (1,3-butadiene-2-yl)tributyl tin and subjected to chlorinolysis to obtain novel polymers of chloroprene having any desired cis-trans content.

It has been found that cis-polychloroprene, when suitably compounded and cured, retains its tensile strength under stress at high temperature such as at 100° C. to an exceptionally high degree, i.e., at least 30% of its 25° C. strength, when compared with a predominantly trans-polychloroprene of similar molecular weight, as shown in Example 3 hereinbelow. This unexpected property makes it useful for applications in which it will be exposed to high temperatures, such as in radiator hose, electrical insulation, and motor mounts.

DESCRIPTION OF THE PREFERRED EMBODIMENTS

The series of steps and materials used for the preparation of predominantly cis-polychloroprene will be discussed in detail starting with making of the new chemical intermediate compounds.

(a) (1,3-butadien-2-yl)trialkyltin.—These compounds are prepared from the compound 1,3-butadien-2-ylmagnesium chloride. 1,3-Butadien-2-ylmagnesium chloride is prepared by reacting 4-chloro-1,2-butadiene of the formula

with magnesium in the presence of a dialkyl ether solvent. A solution containing 10 to 50 percent by weight of 4-chloro-1,2-butadiene in the ether solvent, preferably ethyl ether, is added dropwise to a vigorously agitated mixture of finely divided magnesium metal in 10 to 20 times its weight of the solvent. The reaction is carried out in an inert atmosphere, such as in an atmosphere of nitrogen at 20–70° C. It is convenient to use reflux conditions. The solvent solution of the butadienylmagnesium chloride may be used directly for the preparation of (1,3-butadien-2-yl)trialkyl tin.

The 1,3-butadien-2-ylmagnesium chloride is converted to a (1,3-butadien-2-yl)trialkyl tin compound by reaction with the corresponding trialkyltin chloride or bromide or with a bis(trialkyl)tin oxide of the formula:

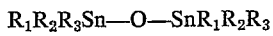

wherein $R_1$, $R_2$, and $R_3$ are alkyl groups having 1 to 8 carbon atoms. It is preferred that the alkyl groups should contain 2 to 6 carbon atoms. Each molecule of bis(trialkyltin) oxide reacts with 2 molecules of the butadienylmagnesium chloride, and each molecule of trialkyltin halide reacts with one molecule of butadienylmagnesium chloride. While trimethyltin radicals are sufficiently bulky to force the molecule to assume a predominantly cis configuration, trialkyltin groups wherein the alkyl groups contains 2 or more carbon atoms are even more effective. The upper limit on the number of carbon atoms is primarily a matter of economics, and availability of material. In general, for the purposes of preparing cis-polychloroprene, there is no advantage to be gained in having the alkyl groups contain more than 8 carbon atoms.

The trialkyltin halides or the bis(trialkyltin) oxides are old compounds which may be prepared in known ways. See, for example, Journal of Applied Chemistry 6, 49–60 (1956).

By using the appropriate trialkyltin compound, one may obtain such compounds as (1,3-butadien-2-yl)-trimethyltin,
(1,3-butadien-2-yl)triethyltin,
(1,3-butadien-2-yl)tri-n-propyltin,
(1,3-butadien-2-yl)tri-n-butyltin,
(1,3-butadien-2-yl)tri-n-amyltin,
(1,3-butadien-2-yl)tri-n-hexyltin,
(1,3-butadien-2-yl)tri-n-octyltin,
(1,3-butadien-2-yl)diethyloctyltin, and
(1,3-butadien-2-yl)diethyl-n-amyltin.

The reaction of the butadienylmagnesium chloride with the trialkyltin compound should be carried out in an inert solvent in which the organic reactants are soluble. Examples of suitable solvents are pentane, hexane, cyclohexane, heptane, dialkyl ethers, tetrahydrofuran, benzene, and toluene. Mixtures of solvents may be used.

The reaction is carried out in the temperature range of about 40 to 100° C. in an inert atmosphere, for example, in an atmosphere of an inert gas such as nitrogen or argon. Atmospheric pressure is preferred, although higher or lower pressures may be used. A solvent solution of butadienylmagnesium chloride is added gradually to the solution of the trialkyltin compound. If the solvent containing the butadienylmagnesium chloride boils below the desired reaction temperature, it may be distilled off and collected during the course of the reaction. At temperatures below about 40° C. the reaction proceeds too slowly to be practical, and at temperatures above about 100° C. the yield is decreased because of side reactions and decomposition. The time required for completion of the reaction is dependent on the temperature. One to five hours is usually sufficient. Tests for completion of reaction may be made by titrating for the butadienylmagnesium chloride by the Gilman Method. J. Am. Chem. Soc. 51, 1576 (1929).)

The product is isolated using known techniques. For example, the magnesium salts which precipitate may be redissolved by addition of dilute hydrochloric acid at 0° C. and the aqueous and organic layers may then be separated. The separation can be stopped at this point or continued further to recover the butadienyltrialkyltin compound from the organic phase. The organic layer may be dried by treatment with a drying agent such as calcium chloride and the solvent may be removed under vacuum. The product may be purified by conventional techniques, such as by fractional distillation.

(b) Polymerization of (1,3-butadien-2-yl)-trialkyltin.—The compounds, (1,3-butadien-2-yl)trialkyltin, polymerize by a 1,4 addition to yield a polymer consisting predominantly of units

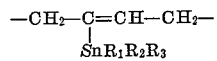

Because of the steric effect of the trialkyltin radical, the polymer is forced to assume the cis configuration. Polymerization is preferably carried out in an inert atmosphere by direct addition to the undiluted monomer of an initiator yielding free-radicals. The preferred polymerization initiators are the azo compounds disclosed in U.S. 2,471,959, such as 2,2′-azobis(2-methylpropionitrile). Peroxides may also be used, but these are less desirable because of their oxidizing effect. Suitable temperatures for the polymerization will depend on the choice of initiator. In general, temperatures of 0–100° C. are convenient. With the preferred azonitrile catalysts, such as 2,2′-azobis(2-methylpropionitrile), temperatures of about 50 to 80° C. are particularly effective. If desired, the polymerization may be carried out in an inert solvent such as benzene, pentane and the like. Atmospheric pressure is preferred, although higher or lower pressure may be used.

The time required for polymerization will vary with the temperature, activity of the catalyst, etc. In general, times of from 5 hours to 10 days should be satisfactory. The molecular weight of the (1,3-butadien-2-yl)trialkyltin polymers will, in general, range from about 10,000 to 600,000 and even higher. Even lower molecular weight polymers may be prepared if desired by addition to the polymerization system of a chain-transfer agent such as alkyl mercaptan diphenylmethane, isoproply alcohol, and the like, or by carrying out the polymerization in a solvent which acts as a chain-transfer agent (ethers, dioxane, chloroform, etc.).

The polymer may be isolated by known techniques such as by dissolving the reaction mass in a non-polar, alcohol-miscible solvent such as benzene, toluene, or carbon tetrachloride and reprecipitating by the addition of a polar liquid which is not a solvent for the polymer, such as methanol or ethanol.

(c) cis-Polychloroprene.—The polymerized butadienyltrialkyltin is converted to the corresponding chloro-substituted polymer by a chlorinolysis reaction wherein the trialkyltin radical is replaced by chlorine. This reaction may be carried out by dissolving the polymer in a solvent relatively inert to chlorine and preferably miscible with alcohol, such as benzene, toluene, or preferably a chlorinated hydrocarbon, such as carbon tetrachloride, chlorotrifluormethane, 1,2-dichloroethane, 1,1-dichloroethane, and 1,1,1-trichloroethane. Chlorine is then added to the solution while maintaining the temperature between −50 and +50° C., preferably near 0° C.

Since chlorine can react further by addition to the double bonds of the 2-chloro-2-buten-1,4-ylene groups, it is important to avoid using amounts of chlorine greatly in excess of the stoichiometric amount. Molar amounts ranging from about 85 to about 125 percent of the theoretical amount should give a satisfactory yield of the desired product. The preferred amount is 105–110 percent of theory. The replacement of each trialkyltin radical requires one molecule of chlorine ($Cl_2$).

An inert atmosphere should be maintained in the reaction vessel. The polymer may be isolated by techniques similar to those used for isolating the poly(butadienyltrialkyltin).

The resulting chloro-substituted polymer consists predominantly of 2-chloro-2-buten-1,4-ylene units,

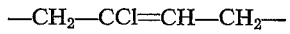

in the cis configuration. This is established by infrared and nuclear magnetic resonance spectra, by chemical analysis, and by ozonolysis of the polymer to give succinic acid. The polymer containing at least 90% by weight of cis repeat units has a glass transition temperature of about −20° C.; that containing at least 50% of cis units has a glass transition temperature of about from −33° C. to −20° C.

There will be no significant change in the chain length of the polymers during chlorinolysis. Therefore, because of the difference in molecular weight between the chlorine radicals and the trialkyltin radicals, the polymers consisting predominantly of the 2-chloro-2-butene-1,4-ylene units will have an average molecular weight about 0.17 to about 0.4 times that of the butadienyltrialkyltin polymers.

The compounding and curing of the cis-polychloroprene employs the same stablizing ingredients and is similar methodwise to that of the conventional polychloroprenes, as described in "The Neoprenes" published in 1953 by E. I. du Pont de Nemours and Co. Example 3 of this specification shows the curing of a gum stock, but the cis-polychloroprene may also be used in stocks containing conventional reinforcing agents such as clay and carbon black.

Representative examples of the present invention are as follows. Parts and percents are by weight unless otherwise indicated.

EXAMPLE 1

(a) Preparation of (1,3-butadien - 2-yl)tributyltin.— A round-bottom flask equipped with mechanical agitator, reflux condenser, and dropping funnel is swept with nitrogen. The flask is charged with 25 grams (1.03 mole) of magnesium turnings in 300 ml. of anhydrous ethyl ether. To the dropping funnel is charged 82.0 grams (0.93 mole) of 4-chloro-1,2-butadiene in 220 ml. of anhydrous ethyl ether. Twenty-five ml. of solution in the dropping funnel is added to the flask and the flask is heated to reflux.

The reaction is initiated by adding a mixture prepared as follows: In a small test tube is placed 0.04 gram of magnesium turnings, 0.025 gram of mercuric chloride, 0.7 gram of ethyl ether, 0.02 gram of 4-chloro-1,2-butadiene and 0.03 gram of methyl iodide. An exothermic reaction is initiated by brief warming and crushing of the magnesium with a stirring rod. The mixture so obtained is added to a 50-ml. Erlenmeyer flask containing 0.5 gram of 4-chloro-1,2-butadiene 0.2 gram of magnesium turnings, and 4 ml. of anhydrous ethyl ether. On warming and stirring for about 10 minutes, the reaction becomes self-sustaining. The contents of the Erlenmeyer flask are added to the round-bottom flask. External heating is removed, and the solution of 4-chloro-1,2-butadiene in the dropping funnel is added dropwise with vigorous stirring over a period of 2.5 hours. The heat of reaction is sufficient to maintain gentle reflux of the ethyl ether during this period. After the addition is completed, the mixture is refluxed for 0.5 hour.

Excess magnesium is removed by filtering the solution through a plug of glass wool. Titration by the Gilman method shows that the solution contains about 0.85 mole (95.2 grams) of 1,3-butadien-2-yl)-magnesium chloride. The filtered solution is placed under nitrogen in a 500-ml. dropping funnel attached to a 2-liter round-bottom flask equipped with a mechanical agitator. A thermometer, and a Claisen distilling head. To the flask is charged a solution of 250 grams (0.419 mole) of bis(tributyltin) oxide in 700 ml. of anhydrous heptane and 250 ml. of anhydrous tetrahydrofuran. The mixture is heated to 70° C. and the solution of butadienylmagnesium chloride is added from the dropping funnel over a period of one-half hour with vigorous agitation while maintaining the temperature at 65–76° C. The ether which distills through the Claisen head is condensed and collected in a receiver. After the addition of butadienylmagnesium chloride is complete, the temperature is allowed to rise to 75° C., and the Claisen head is replaced with a reflux condenser. The mixture is stirred at 75–80° C. for 2.5 hours and then cooled to 5° C. The magnesium salts which separate are dissolved by slowly adding 450 ml. of 8% hydrochloric acid. The layers are separated, and the organic layer is washed with 200 ml. of 10% sodium chloride. The sodium chloride solution is extracted with 100 ml. of heptane, and the resulting heptane solution is combined with the original organic layer. The combined organic extract is filtered through calcium chloride and concentrated in vacuo on a steam bath. The cloudy yellow residual oil (293 grams) is fractionally distilled through a 20-inch Vigreux column. 220 grams of product, (1,3-butadien-2-yl)tributyltin, are obtained (76.4% yield). The compound has a boiling point of 89–90° C./0.4 mm. Hg. Analyses show the following:

Calcd. for $C_{16}H_{32}Sn$ (M.W., 343.1), (percent): C, 56.01; H, 9.44; Sn, 36.40. Found (M.W., 340, 335), (percent): C, 55.7, 55.6; H, 9,4, 9.4; Sn, 34.8, 34.9.

Molecular weight is determined cyroscopically in benzene.

The infrared spectrum and nuclear magnetic resonance spectrum are consistent with the assigned structure. The ultraviolet spectrum has an absorption peak at 217 mµ with an extinction coefficient of 11,600.

When the procedure described above is repeated using one of the following compounds instead of bis(tributyltin) oxide, the product in each case, is the corresponding (1,3-butadien-2-yl)trialkyltin as shown below:

| Starting bis(trialkyltin) oxide | Product |
|---|---|
| Bis(trimethyltin) oxide | (1,3-butadien-2-yl)trimethyltin. |
| Bis(triethyltin) oxide | (1,3-butadien-2-yl)triethyltin. |
| Bis(tri-n-octyltin) oxide | (1,3-butadien-2-yl)tri-n-octyltin. |
| Bis(diethyl-n-octyltin) oxide | (1,3-butadien-2-yl)diethyl-n-octyltin. |
| Bis(diethyl-n-amyltin) oxide | (1,3-butadien-2-yl)diethyl-n-amyltin. |
| Bis(tri-n-hexyltin) oxide | (1,3-butadien-2-yl)tri-n-hexyltin. |

Similar results are obtained when tributyltin chloride or bromide is used instead of the bis(tributyltin) oxide in the foregoing process except that twice the molar amount of the tributyltin halide is used.

(b) Polymerization of (1,3-butadien - 2 - yl)tributyltin.—A 250-ml. round-bottom flask, equipped with a thermometer, a mechanical agitator, and containing a nitrogen atmosphere is charged with 226 grams of (1,3-butadien-2-yl)tributyltin and heated to 55° C. The temperature is maintained at 55–60° C. during the polymerization. A total of 0.120 gram of 2,2′-azobis(2-methylpropionitrile) is added in 0.015 gram portions at intervals of one to two days. At the end of 13 days the mixture is diluted with 100 ml. of benzene and poured into 2 liters of methanol. The white polymer which separates is washed with 2 one-liter portions of methanol, dissolved in 500 ml. of benzene, and reprecipitated in 2.5 liters of methanol. Residual solvent is removed by maintaining the polymer at 0.1 mm. Hg at 55–60° C. for 24 hours to yield 113 grams (50% conversion) of polymer as a very viscous clear oil.

The polymer is dissolved in 2.5 liters of benzene and precipitated by dropwise addition of 535 ml. of methanol. The polymer separates as a lower liquid layer swollen with benzene. It is isolated by separating and adding 1.5 liters of methanol. After washing with methanol and drying, there remains 84.5 grams of polymer. This is dissolved in 2.5 liters of benzene, and two fractions are coacervated by dropwise addition of 505 and 45 ml., respectively, of methanol, then isolated by precipitation in methanol. Fraction A weights 25.0 grams and Fraction B weighs 38.0 grams. Residual solvent is removed from each fraction at 0.1 mm. Hg and 55–60° C.

Inherent viscosities are determined using a solution of 0.1 gram of the polymer in 100 ml. of benzene at 30° C. Fraction A has an inherent viscosity of 0.64 and Fraction B has an inherent viscosity of 0.40. Analyses show the following:

|  | Calc. for $(C_{16}H_{32}Sn)_x$ | Found | |
|---|---|---|---|
|  |  | Fraction A | Fraction B |
| C, percent | 56.01 | 56.1, 55.8 | 55.8, 56.0 |
| H, percent | 9.44 | 9.3, 9.2 | 9.0, 9.2 |
| Sn, percent | 34.60 | 34.5 | 34.4 |

The (1,3-butadien-2-yl)tributyltin starting material may be replaced by any of the representative (1,3-butadien-2-yl)trialkyltin compounds cited in part (a) of this example and polymerized in the same manner as the (1,3-butadien-2-yl)tributyltin to give a polymer bearing the corresponding trialkyltin groups.

(c) Preparation of cis-1,4-polychloroprene.—(1) 28.8 grams (0.0840 equivalent of tributyltin groups) of the polymerized (1,4 - butadien-2-yl)-tributyltin prepared as described in Part (b) above is dissolved in 350 ml. of spectrograde carbon tetrachloride. (The sample used is composed of 24.1 grams of Fraction A and 4.7 grams of Fraction B). The solution is cooled to 2° C. in a 1-liter round-bottom flask equipped with mechanical agitator, thermometer, 500-ml. dropping funnel, and maintained under a nitrogen atmosphere. To the well-stirred solution is added dropwise from the dropping funnel a solution of 6.43 grams (0.0907 mole) of chlorine in 336 ml. of carbon tetrachloride. The addition is completed in 5 hours, during which time the flask is maintained at 1–3° C.

The nearly colorless reaction mixture is poured into 2.5 liters of methanol containing 2 grams of sodium chloride and 1 gram of 2,2'-methylene-bis(6-tert-butyl-p-cresol) (an antioxidant). The polymer which precipitates as a white elastomeric solid is washed with fresh methanol and dried in a stream of nitrogen. It is dissolved in 100 ml. of benzene and reprecipitated by passing it through a capillary into 1800 ml. of methanol in a 2-liter graduated cylinder while stirring with a magnetic agitator. The polymer is cut into small pieces and soaked in methanol overnight. Residual solvent is removed by heating at 45–55° C. at a pressure of 0.05 mm. Hg. The yield is 7.40 grams of pale amber cis-1,4-polychloroprene (theory, 7.44 grams). The inherent viscosity is 0.55 (determined at 30° C. as a solution of 0.1 gram in 100 ml. of benzene). The number average molecular weight (determined by osmometry in benzene) is 66,000. The structure is shown by infrared spectroscopy and nuclear magnetic resonance to consist of at least 90% of cis-1,4-structural units, that is, units of the structure.

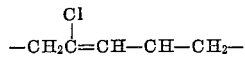

having the cis configuration.

Analyses show the following:

Calculated for $(C_4H_5Cl)_x$ (percent): C, 54.26; H, 5.69; Cl, 40.05; Sn, 0.00. Found (percent): C, 51.0, 50.7; H, 5.6, 5.6; Cl, 42.1, 42.3; Sn, 1.0, 0.9.

The polymer is a solid elastomeric gum with a second-order transition temperature (glass transition temperature) of about −20° C. and a density of 1.283 g./cc. at 25° C. When the material is allowed to reach equilibrium at 25° C., the crystallites developed show a melting point of about 70° C. A typical sample of predominantly trans-polychloroprene has a second-order transition temperature of about −40° C. and the crystallites developed at room temperature melt at about 45° C.

(2) Another sample of polymer is prepared as described in paragraph (1) above starting with 20.5 grams (0.0598 equivalent, based on tributyltin groups) of polymerized (1,4-butadien-2-yl) tributyltin and 4.50 grams (0.0634 mole) of chlorine. After isolation and purification there is obtained 4.9 grams (theory, 5.29 grams) of cis-polychloroprene having an inherent viscosity of 0.52.

Analyses are as follows:

Calculated for $(C_4H_5Cl)_x$ (percent): C, 54.26; H, 5.69; Cl, 40.05. Found (percent): C, 53.6, 53.5; H, 6.2, 5.9; Cl, 39.9, 39.8.

A 1.60-gram portion of this material is dissolved in 100 ml. of chloroform and cooled to 0° C. in a 500-ml. round-bottom flask equipped with mechanical agitator, thermometer, cold-finger reflux condenser, and an inlet tube extending below the surface of the liquid. Water (50 ml.) is added to the flask. Ozone, as a 1% mixture in air, is passed in at the rate of about one gram per hour for 3 hours at −0° C. to +5° C. The ozonides are decomposed by stirring at room temperature overnight and then refluxing for three hours. The layers are separated and the water layer is freeze-dried leaving about 1.9 grams of off-white crystalline material. This crude product is chromatographed on silicic acid using a mixture of chloroform and ethanol as eluant. Pure succinic acid (1.32 grams, 62%) so obtained has a melting point of 187–188° C. A mixed melting point with authentic succinic acid is 188–189° C. The infrared spectrum is identical with that of authentic succinic acid.

This further establishes that the polymer prepared consists predominantly of units of the structure —$CH_2$—$CCl$=$CH$—$CH_2$—.

Polymers consisting of more than 50% by weight of 2-chloro-2-buten-1,4-ylene units in the cis configuration are prepared when the polymerized (1,3-butadien-2-yl)tributyltin used in this example is replaced by any of the (1,3-butadien-2-yl)trialkyltin polymers of Part (b) of this example.

EXAMPLE 2

A polymer of (1,3-butadien-2-yl)tributyltin is prepared following the procedure of Example 1, Paragraph (b). A fraction of polymer having an inherent viscosity of 0.82 is obtained by fractionation by methanol precipitation from benzene solution. When this sample is converted to cis-polychloroprene as described in Example 1, paragraph (c), a polymer having an inherent viscosity of 0.71 is obtained. The number average molecular weight (determined by osmometry in benzene) is about 150,000. The structure is shown by infrared spectroscopy and nuclear magnetic resonance to consist of at least 90% cis-1,4-structural units.

Analyses show the following:

Calculated for $(C_4H_5Cl)_x$ (percent): C, 54.26; H, 5.69; Cl, 40.05. Found (percent): C, 53.4, 53.2; H, 5.9, 6.0; Cl, 40.3, 40.4.

EXAMPLE 3

A conventional polychloroprene is prepared using the following recipe:

| | Parts by weight |
|---|---|
| Chloroprene | 100 |
| Dodecyl mercaptan | 0.5 |
| Disproportionated rosin | 3 |
| Sodium hydroxide (100%) | 0.5 |
| Water | 109 |
| Sodium salt of formaldehyde-naphthalenesulfonic acid condensate | 0.4 |
| Sodium sulfite | 0.3 |

The catalyst is 1.50 ml. of a solution consisting of 2.00 grams of potassium persulfate and 0.18 gram of sodium 2-anthraquinonesulfonate in 67.5 grams of water, which is added over a three-hour period. Polymerization is carried out at 40° C. in a nitrogen atmosphere. Polymerization is carried out to about a 70% monomer conversion.

Polymerization is stopped by adding an emulsion of phenothiazine and p-tertiarybutylcatechol as described in U.S. 2,576,009, excess monomer is removed by steam stripping, as described in U.S. 2,467,769, the emulsion is acidified with 10% acetic acid to a pH of about 6 and the polymer is removed by freeze coagulation in the form of a thin film as described in U.S. 2,187,146.

The conventional polymer has an inherent viscosity of 0.66. A cis-polychloroprene having an inherent viscosity of 0.68 is prepared by chlorinolysis as in Example 1, Paragraph (c), of (1,3-butadien-2-yl)tributyltin having an inherent viscosity of 0.70 and prepared according to the procedure of Example 1, Paragraph (b).

Samples of the conventional poly-chloroprene and of the cis-polychloroprene are compounded using the following recipe:

| | Parts by weight |
|---|---|
| Polymer | 100 |
| 2,2'-methylenebis(6-tert-butyl-p-cresol) | 1 |
| Magnesium oxide | 4 |
| Zinc oxide | 5 |
| Di-o-tolylguanidine | 0.25 |
| Tetramethylthiuram monosulfide | 0.25 |
| Sulfur | 0.5 |
| 2-mercapto-2-imidazoline | 0.2 |

The compounded polymers are cured in a mold under pressure for 20 minutes at the temperatures shown in the table given below. The tensile properties of the two polymers are measured on an Instron tensile tested pulling at a cross-head speed of 20 inches per minute. The table shows the results of the tests.

| | Conventional polychloroprene | Cis-polychloroprene |
|---|---|---|
| Cure, °C | 153 | 153 |
| Tested at 25° C.: | | |
| Elongation at the break, percent | 870 | 280 |
| Modulus at 200% elongation, p.s.i. | 150 | 300 |
| Tensile strength at the break, p.s.i. | 2,250 | 500 |
| Tested at 100° C.: | | |
| Elongation at the break, percent | 120 | 60 |
| Tensile strength at the break, p.s.i. | 105 | 155 |

The above table shows that the cis-polychloroprene has an exceptionally good retention of tensile strength at 100° C. compared with the conventional polychloroprene sample.

EXAMPLE 4

2-tri-n-butyltin-1,3-butadiene and chloroprene is copolymerized in bulk using a catalyst of azo-bis-isobutyronitrile. The copolymers obtained are isolated by precipitation with methanol, and are purified by dissolution in benzene followed by precipitation with methanol. The composition of the copolymers is found by analysis for tin and for chlorine. The copolymers are then chlorinolysed by dissolving them in carbon tetrachloride to which chlorine is added in an amount equal to 106 mole percent of the moles of tri-n-butyl tin groups present.

The products, cis/trans-polychloroprene polymers are isolated by precipitation with methanol. They are purified by dissolving in benzene and precipitating with methanol. The cis content of each polymer is determined by infrared and compared with the cis content calculated from the composition of the precursors assuming that the (2-tri-n-butyltin)-2-buten-1,4-ylene units of the copolymer gave 100% cis 1,4- units and that the 2-chloro-2-buten-1,4-ylene units gave 90% trans-1,4- and 10% cis 1,4 units.

The quantities employed, and the analytical data for these polymers is given in the following table.

TABLE I.—PREPARATION OF CIS-/TRANS-POLYCHLOROPRENES

| Exp. No. | Monomer A [1] (g.) | Monomer B [2] (g.) | AIBN [3] catalyst (g.) | Hrs. at 60-65° C. | Yield (g.) | Copolymer wt. percent A [4] | B [5] | $\eta$inh [6] |
|---|---|---|---|---|---|---|---|---|
| 1 | 90.0 | 7.64 | 0.20 | 107 | 51 | 62.4 | 37.2 | 0.57 |
| 2 | 60.0 | 6.60 | 0.10 | 48 | 32 | 49.5 | 49.6 | 0.50 |
| 3 | 70.0 | 13.8 | 0.10 | 20 | 33 | 32.6 | 66.9 | 0.69 |

| | Chlorinolysis | | | | Cis-/trans-polychloroprenes | | | | |
|---|---|---|---|---|---|---|---|---|---|
| Exp. No. | Copolymer wt. (g.) | mmoles A | mmoles Cl [2] | Volume CCl [4] (ml.) | Wt. (g.) | $\eta$inh [6] | Percent cis-1,4 Calc. | Found [7] | Percent trans-1,4 Calc. | Found [7] |
| 1 | 25.3 | 64.0 | 67.8 | 1,135 | 6.6 | 0.67 | 67 | 69 | 33 | 29 |
| 2 | 25.2 | 58.5 | 61.4 | 1,170 | 9.2 | 0.53 | 55 | 62 | 45 | 37 |
| 3 | 27.3 | 52.3 | 55.4 | 1,080 | 12.3 | 0.74 | 39 | 47 | 61 | 52 |

[1] Monomer A is 2-(tri-n-butyltin-1,3-butadiene).
[2] Monomer B is 2-chloro-1,3-butadiene.
[3] Azo-bis-isobutyronitrile catalyst.
[4] Calc. from percent tin in copolymer.
[5] Calc. from percent chlorine in copolymer.
[6] Measured on 0.1% solutions in benzene at 30° C.
[7] Found by infrared analysis of the C=C stretching bands near 1660 cm.$^{-1}$.

Gum stocks of the cis-trans polychloroprene of Experiment 1, containing 69% cis 1,4 units and 29% trans 1,4 units, and a blend of conventional polychloroprene and containing about 90% trans and about 10% cis-1,4 units with 100% cis polychloroprene, were compounded according to the following recipe and cured as ¾ inch pellets at 307° F. for 15 minutes.

CURING RECIPES FOR CIS-/TRANS-POLYCHLOROPRENE AND BLEND

| | Wgt. (mg.) | |
|---|---|---|
| Component | A cis-trans polymer | B Blend |
| 69% cis-polychloroprene (Exp. 1, Table I) | 4,000 | |
| 100% cis-polychloroprene | | 3,000 |
| Conventional polychloroprene | | 1,900 |
| 2,2'-methylene bis (4-methyl-6-tert-butyl phenol) | 40 | 49 |
| Magnesium oxide | 140 | 170 |
| Zinc oxide | 180 | 220 |
| Di-o-tolyl guanidine | 9.0 | 11 |
| Tetramethyl thiuram monosulfide | 9.0 | 11 |
| Sulfur | 18 | 22 |
| 2-mercaptoimidazoline | 7.0 | 8.6 |
| Composition: | | |
| Percent cis- | 69 | [1]65 |
| Percent trans- | 29 | [1]35 |

[1] Calculated assuming that conventional polychloroprene is 90% trans- and 10% cis-polychloroprene.

The freeze resistance of the cis-trans polymers and of the blend of cis and trans polymers was determined by measuring the Shore A hardness of pellets stored at 0° C. the Shore hardness of the cis-trans polymers was found to become constant at a value of 55 after 72 hours, whereas the blend attained a constant value of 69 after 96 hours.

As many apparently widely different embodiments of this invention may be made without departing from the spirit and scope thereof, it is to be understood that this invention is not limited to the specific embodiments except as defined in the appended claims.

What is claimed is:
1. Elastomeric polychloroprene containing at least 50% by weight of its 2-chloro-2-buten-1,4-ylene units in the cis configuration, said polychloroprene being characterized by having a glass transition temperature within the range from about −33° C. to −20° C.

2. Elastomeric polychloroprene containing at least 90% by weight of cis-2-chloro-2-buten-1,4-ylene repeat units, said polychloroprene being characterized by having a glass transition temperature of about −20° C. and, when under stress at 100° C., by retaining its tensile strength to an exceptionally high degree when compared with a predominantly trans-polychloroprene of similar molecular weight.

3. A process for the preparation of polychloroprene, which comprises polymerizing, in the presence of a free-radical polymerization initiator, (1,3-butadien-2-yl) trialkyltin of the formula:

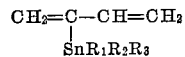

wherein $R_1$, $R_2$, and $R_3$ are independently selected alkyl radicals, and contacting and reacting the resultant polymer with about a stoichiometric amount of chlorine in the presence of an inert solvent medium and an inert atmosphere and at a temperature within the range of about −50° C. to about 50° C.

4. The process of claim 3 wherein the (1,3-butadien-2-yl)trialkyltin is contained within an inert organic solvent during the polymerizing step.

5. The process of claim 3 wherein the polymerization step is carried out at a temperature within the range of about 0° C. to about 100° C.

6. (1,3-utadien-2-yl)trialkyltin having the formula

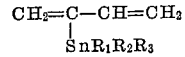

wherein $R_1$, $R_2$, and $R_3$ are independently selected alkyl radicals.

7. A polymer of (1,3-butadien-2-yl)trialkyltin.

8. A process which comprises, contacting and reacting, in the presence of an inert organic solvent and an inert atmosphere, (1,3-butadien-2-yl)-magnesium chloride with a trialkyltin compound selected from the group consisting of bis(trialkyl)tin oxide and trialkyltin halide, said halide being taken from the class consisting of chloride and bromide, the trialkyl component of said trialkyltin compound being independently selected from the group consisting of $C_1$–$C_8$ alkyl, and obtaining as a result thereof (1,3-butadien-2-yl)trialkyltin.

9. The process of claim 8 wherein the contacting and reacting step is carried out at a temperature within the range of about 40° C. to about 100° C.

10. A process for the preparation of (1,3-butadien-2-yl)trialkyltin polymer from the monomer thereof, which comprises heating said monomer to a temperature within the range of about 0° C. to about 100° C., in the presence of a free-radical polymerization initiator and for a sufficient period of time to cause polymerization of said monomer.

11. The process of claim 10 wherein the heating step is carried out in the presence of an inert organic solvent.

12. A process for the preparation of cis-polychloroprene, which comprises, polymerizing (1,3-butadien-2-yl)tributyltin, in the presence of a free-radical polymerization initiator, and contacting and reacting the resultant polymer with about a stoichiometric amount of chlorine in the presence of an inert organic solvent and an inert atmosphere and at a temperature within the range of about −50° C. to about 50° C.

References Cited

UNITED STATES PATENTS 3,067,189   4/1962   Balas _____ 260—94.3
3,215,682   11/1965  Farrar et al. _____ 260—94.3

OTHER REFERENCES

J. Polymer Science: part A, vol. 2:4727–33 (1964).

JOSEPH L. SCHOFER, Primary Examiner

J. C. HAIGHT, Assistant Examiner

U.S. Cl. X.R.

260—695, 899, 80.7, 82.1, 91.5, 91.7, 95, 96, 429.7, 694